（12） United States Patent
Skripkar et al.

(10) Patent No.: US 8,833,672 B2
(45) Date of Patent: Sep. 16, 2014

(54) FLOW CONTROL DEVICE AND METHOD FOR IRRIGATION SPRINKLERS

(75) Inventors: Kenneth J. Skripkar, Tucson, AZ (US); Krishnadidya G. Arkalgud, Sahuarita, AZ (US); Gregory S. Palumbo, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 1062 days.

(21) Appl. No.: 12/860,199

(22) Filed: Aug. 20, 2010

(65) Prior Publication Data

US 2012/0043397 A1 Feb. 23, 2012

(51) Int. Cl.
*B05B 17/04* (2006.01)
*B05B 15/10* (2006.01)
*B05B 1/30* (2006.01)

(52) U.S. Cl.
CPC .............. *B05B 15/10* (2013.01); *B05B 1/3006* (2013.01)
USPC .............. 239/11; 239/71; 239/106; 239/113; 239/203; 239/205; 239/570; 239/571; 239/572; 239/575; 137/68.14; 137/71; 137/505

(58) Field of Classification Search
USPC .......... 239/71, 104, 106, 112, 113, 200, 201, 239/203–205, 207, 533.1, 533.15, 569–572, 239/575, 1, 11; 137/67, 68.14, 71, 116.3, 137/505
See application file for complete search history.

(56) References Cited

U.S. PATENT DOCUMENTS

| | | | |
|---|---|---|---|
| 1,799,243 | A | 4/1931 | Miller |
| 1,869,920 | A | 8/1932 | Soubier |
| 1,919,244 | A | 7/1933 | Munz |
| 2,097,908 | A | 11/1937 | Allen |
| 2,125,863 | A | 8/1938 | Arbogast |
| 2,652,282 | A | 9/1953 | Willetts |
| 3,113,473 | A | 12/1963 | Morlen |
| 3,228,653 | A | 1/1966 | Trimmer |
| 3,272,399 | A | 9/1966 | Dight |
| 3,323,725 | A | 6/1967 | Hruby, Jr. |
| 3,383,047 | A | 5/1968 | Hauser |
| 3,405,871 | A | 10/1968 | Mullan |
| 3,443,753 | A | 5/1969 | McDonnell |
| 3,521,822 | A | 7/1970 | Friedmann et al. |
| 3,655,132 | A | 4/1972 | Rosic |
| 3,739,946 | A | 6/1973 | Scholer |

(Continued)

FOREIGN PATENT DOCUMENTS

| | | |
|---|---|---|
| CN | 201067720 | 6/2008 |
| EP | 1103311 | 5/2001 |

(Continued)

*Primary Examiner* — Steven J Ganey
(74) *Attorney, Agent, or Firm* — Fitch, Even, Tabin & Flannery, LLP

(57) ABSTRACT

An irrigation sprinkler is provided having a nozzle and a flow control device for reducing fluid flow through the sprinkler when the nozzle is removed, such as might occur due to vandalism. The flow control device is coupled to the nozzle and is moveable between a first irrigating position and a second signaling position. In the first position, the sprinkler discharges fluid for irrigation. In the second position, the sprinkler discharges a reduced amount of fluid and signals that the nozzle has been removed and should be replaced. The flow control device also allows sufficient fluid flow for flushing debris out of the sprinkler when a flush cap is mounted to the sprinkler, instead of the nozzle.

23 Claims, 7 Drawing Sheets

(56) References Cited

U.S. PATENT DOCUMENTS

| | | |
|---|---|---|
| 3,776,463 A | 12/1973 | Dyck |
| 3,785,565 A | 1/1974 | Perry et al. |
| 3,977,063 A | 8/1976 | Bruninga |
| 4,099,670 A | 7/1978 | Cole et al. |
| 4,131,235 A | 12/1978 | Lieding |
| 4,145,003 A | 3/1979 | Harrison et al. |
| 4,189,099 A | 2/1980 | Bruninga |
| 4,254,911 A | 3/1981 | Hait |
| 4,367,861 A | 1/1983 | Bray et al. |
| 4,393,992 A | 7/1983 | Strunk et al. |
| 4,394,969 A | 7/1983 | Jette |
| 4,411,405 A | 10/1983 | Barbe |
| 4,432,495 A | 2/1984 | Bruninga |
| 4,479,611 A | 10/1984 | Galvis |
| 4,497,440 A | 2/1985 | Galloway |
| 4,562,962 A | 1/1986 | Hartman |
| 4,624,412 A | 11/1986 | Hunter |
| 4,637,547 A | 1/1987 | Hiniker et al. |
| 4,681,259 A | 7/1987 | Troup et al. |
| 4,729,511 A | 3/1988 | Citron |
| 4,732,190 A | 3/1988 | Polselli |
| 4,736,889 A | 4/1988 | Stephenson |
| 4,773,595 A | 9/1988 | Livne |
| 4,774,977 A | 10/1988 | Cohen |
| 4,781,327 A | 11/1988 | Lawson et al. |
| 4,796,804 A | 1/1989 | Weiss |
| 4,825,897 A | 5/1989 | Shade |
| 4,834,289 A | 5/1989 | Hunter |
| 4,840,312 A | 6/1989 | Tyler |
| 4,842,198 A | 6/1989 | Chang |
| 4,848,661 A | 7/1989 | Palmer et al. |
| 4,867,603 A | 9/1989 | Chang |
| 4,886,209 A | 12/1989 | Dawn |
| 4,892,252 A | 1/1990 | Bruninga |
| 4,961,534 A | 10/1990 | Tyler et al. |
| 4,972,993 A | 11/1990 | Van Leeuwen |
| 5,005,767 A | 4/1991 | Heren |
| 5,086,976 A | 2/1992 | Sessions |
| 5,105,853 A | 4/1992 | Lie |
| 5,174,500 A * | 12/1992 | Yianilos ............... 239/201 |
| 5,211,335 A | 5/1993 | Strid |
| 5,335,857 A | 8/1994 | Hagon |
| 5,368,229 A | 11/1994 | Hayes et al. |
| 5,372,306 A | 12/1994 | Yianilos |
| 5,383,600 A | 1/1995 | Verbera et al. |
| 5,456,411 A | 10/1995 | Scott et al. |
| 5,465,752 A | 11/1995 | Higgins |
| 5,524,824 A | 6/1996 | Frimmer |
| 5,699,962 A | 12/1997 | Scott et al. |
| 5,758,682 A | 6/1998 | Cain |
| 5,762,270 A | 6/1998 | Kearby et al. |
| 5,779,148 A | 7/1998 | Saarem et al. |
| 5,785,246 A | 7/1998 | King et al. |
| 5,857,487 A | 1/1999 | Carson et al. |
| 5,938,121 A | 8/1999 | Ferguson et al. |
| 5,964,408 A | 10/1999 | Musson |
| 6,000,632 A | 12/1999 | Wallace |
| 6,042,021 A | 3/2000 | Clark |
| 6,050,502 A | 4/2000 | Clark |
| 6,095,432 A | 8/2000 | Casagrande |
| 6,138,924 A | 10/2000 | Hunter et al. |
| 6,178,982 B1 | 1/2001 | Longstreth |
| 6,179,221 B1 | 1/2001 | Goldberg et al. |
| 6,202,678 B1 | 3/2001 | Hawkins |
| 6,241,158 B1 | 6/2001 | Clark et al. |
| 6,263,912 B1 | 7/2001 | Brown et al. |
| 6,299,075 B1 | 10/2001 | Koller |
| 6,363,963 B1 | 4/2002 | White |
| 6,367,501 B2 | 4/2002 | Svehaug |
| 6,386,464 B1 | 5/2002 | Watson, Sr. |
| 6,478,237 B2 | 11/2002 | Kearby et al. |
| 6,499,678 B1 | 12/2002 | Hope |
| 6,502,764 B2 | 1/2003 | Walker |
| 6,530,531 B2 | 3/2003 | Butler |
| 6,648,241 B1 | 11/2003 | Doshay |
| 6,651,904 B2 | 11/2003 | Roman |
| 6,732,946 B2 | 5/2004 | Veazie |
| 6,802,458 B2 | 10/2004 | Gregory |
| 6,854,664 B2 | 2/2005 | Smith |
| 6,869,026 B2 | 3/2005 | McKenzie et al. |
| 6,945,471 B2 | 9/2005 | McKenzie et al. |
| 6,957,782 B2 | 10/2005 | Clark |
| 7,097,116 B2 | 8/2006 | Fernandez |
| 7,226,003 B2 | 6/2007 | Kah, Jr. et al. |
| D546,920 S | 7/2007 | Fulkerson |
| 7,293,721 B2 | 11/2007 | Roberts |
| 7,500,620 B2 | 3/2009 | Cordua |
| D597,629 S | 8/2009 | Fulkerson |
| 7,594,615 B1 | 9/2009 | Moore |
| 7,621,464 B2 | 11/2009 | Smith et al. |
| 7,621,467 B1 | 11/2009 | Garcia |
| 7,624,935 B2 | 12/2009 | Nelson et al. |
| 7,631,813 B1 | 12/2009 | Lichte et al. |
| 7,644,870 B2 | 1/2010 | Alexander et al. |
| 7,648,082 B2 | 1/2010 | Roney et al. |
| 7,677,469 B1 | 3/2010 | Clark |
| 7,677,474 B2 | 3/2010 | Markley et al. |
| 7,681,807 B2 | 3/2010 | Gregory |
| 7,686,235 B2 | 3/2010 | Roberts |
| 7,686,236 B2 | 3/2010 | Alexander |
| 7,703,706 B2 | 4/2010 | Walker |
| 7,708,209 B2 | 5/2010 | Kah, Jr. |
| 7,726,587 B2 | 6/2010 | Markley et al. |
| 7,743,786 B2 | 6/2010 | Madama et al. |
| 7,748,646 B2 | 7/2010 | Clark |
| 7,766,259 B2 | 8/2010 | Feith et al. |
| 7,793,868 B2 | 9/2010 | Kah, Jr. et al. |
| 7,823,804 B2 | 11/2010 | Cordua |
| 7,828,230 B1 | 11/2010 | Anuskiewicz et al. |
| 7,832,657 B2 | 11/2010 | Kitamura |
| 7,900,851 B2 | 3/2011 | Ruttenberg |
| 7,971,804 B2 | 7/2011 | Roberts |
| 8,272,578 B1 * | 9/2012 | Clark et al. ............... 239/205 |
| 8,408,228 B1 * | 4/2013 | Jimenez ............... 137/68.14 |
| 2001/0028004 A1 | 10/2001 | Kearby et al. |
| 2002/0063166 A1 | 5/2002 | Walker |
| 2002/0066800 A1 | 6/2002 | Butler |
| 2003/0042327 A1 | 3/2003 | Beutler et al. |
| 2003/0071140 A1 | 4/2003 | Roman |
| 2003/0155433 A1 | 8/2003 | Gregory |
| 2004/0046046 A1 | 3/2004 | Smith |
| 2005/0045737 A1 | 3/2005 | Clark et al. |
| 2006/0049273 A1 * | 3/2006 | Zhang ............... 239/106 |
| 2006/0283976 A1 | 12/2006 | Wlodarczyk |
| 2007/0131802 A1 | 6/2007 | Kah, Jr. et al. |
| 2008/0164341 A1 | 7/2008 | Katzman et al. |
| 2009/0026287 A1 | 1/2009 | Helzer et al. |
| 2009/0032614 A1 | 2/2009 | Ruttenberg |
| 2009/0152377 A1 | 6/2009 | Shahak |
| 2009/0165865 A1 | 7/2009 | Parker |
| 2009/0173904 A1 | 7/2009 | Roberts |
| 2009/0188991 A1 | 7/2009 | Russell et al. |
| 2009/0230206 A1 | 9/2009 | Nies et al. |
| 2010/0147401 A1 | 6/2010 | Gregory |
| 2011/0024523 A1 | 2/2011 | Sesser et al. |
| 2011/0036925 A1 | 2/2011 | Cordua |
| 2011/0057048 A1 | 3/2011 | McAfee |
| 2011/0068195 A1 | 3/2011 | Franks et al. |
| 2011/0089250 A1 | 4/2011 | Zhao et al. |

FOREIGN PATENT DOCUMENTS

| | | |
|---|---|---|
| EP | 2067981 | 6/2009 |
| JP | 2280856 | 11/1990 |
| JP | 20033290384 | 10/2003 |
| JP | 2006281147 | 10/2006 |
| WO | WO9806967 | 2/1998 |
| WO | WO9828042 | 7/1998 |
| WO | WO9830284 | 7/1998 |

* cited by examiner

FLOW CONTROL DEVICE AND METHOD FOR IRRIGATION SPRINKLERS

FIELD

This invention relates to irrigation sprinklers and, more particularly, to a flow control device and method for an irrigation sprinkler.

BACKGROUND

Sprinklers are commonly used for landscape irrigation. It is common for a sprinkler to include a stem with an inlet at one end and a nozzle attached to the other end. One type of stem is a fixed stem. With the fixed stem, one end is connected to a water supply, usually at a point below ground, and the other end extends above ground and is fixed with the nozzle.

Another type of stem is used in a "pop-up" sprinkler as a riser. A pop-up sprinkler is typically buried in the ground and includes a stationary housing and a riser, mounted within the housing. During an irrigation cycle, the riser is propelled through an open upper end of the housing and projects above ground level, or "pops up," to distribute water to surrounding terrain. More specifically, pressurized water is supplied to the sprinkler through a water supply line attached to an inlet of the housing. The pressurized water causes the riser to travel upwards against the bias of a spring to the elevated spraying position above the sprinkler housing to distribute water to surrounding terrain through one or more spray nozzles. When the irrigation cycle is completed, the pressurized water supply is shut off, and the riser is spring-retracted back into the sprinkler housing so that the top of the nozzle, which is attached to the riser, is at or slightly below ground level.

Pop-up sprinklers and other types of sprinklers are frequently shipped and initially operated with a flush cap mounted on the stem or riser, as opposed to a nozzle. The flush cap protects the sprinkler during shipping and reduces the amount of dirt and debris that can enter into the sprinkler. Following installation of the sprinkler, water is initially discharged through the sprinkler to flush out any debris that may have accumulated inside the system. The flush cap is then replaced with a desired nozzle, and the sprinkler is then operated for normal landscape irrigation.

One concern in landscape irrigation is minimizing water waste and loss. Water conservation has become increasingly significant in landscape irrigation. Many communities have regulations on the use of water for landscape irrigation.

Water loss is a major concern if a significant volume of water is discharged when the nozzle on the stem or riser of a pop-up sprinkler is removed or damaged. For example, a user may remove the sprinkler nozzle when changing to a different nozzle or during routine maintenance. Alternatively, a vandal may intentionally damage the sprinkler or cause the nozzle to become partially or completely detached. For instance, children may remove nozzles to unleash a geyser of water for their amusement, especially with respect to sprinklers installed in schools and public areas, such as parks and recreational fields. The damage or removal may not be immediately evident to the user and may result in continued loss of water over an extended period of time. In both instances, this discharge of water may result in flooding or overwatering in certain areas, causing damage to the landscape such as due to puddles or the impact of the water on shrubs and turf, and may also result in underwatering in other areas, especially where the sprinkler is part of a network and other sprinklers experience a decrease in water pressure.

This concern with water loss in landscape irrigation has become even more pronounced with the increased use of reclaimed water for landscape irrigation. Reclaimed water allows communities to more efficiently use their water resources for different purposes, including landscaping. Many communities have laws and regulations that limit the waste and runoff of reclaimed water. It is therefore desirable to design and install irrigation sprinklers that reduce the possibility of flooding and overwatering, thereby increasing the safe use and handling of reclaimed water and compliance with local law.

Accordingly, it would be desirable to include a flow control device for use in a stem or riser of a pop-sprinkler. It would be desirable to include a flow control device that automatically reduces the flow of water through the sprinkler (and subsequent water loss) when the nozzle is detached from the rest of the sprinkler, such as due to the routine exchange of nozzles, due to maintenance, or due to vandalism or other damage to the nozzle. Further, it would be desirable to have a flow control device that can signal nozzle removal or damage to the user to allow prompt action. It also would be desirable develop a flow control device that can be used in conjunction with a flush cap during initial flushing of the sprinkler.

DESCRIPTION OF THE PREFERRED EMBODIMENTS

As shown in FIGS. 1-8, a pop-up sprinkler 10 is provided having a flow control device 12. The flow control device 12 is operatively coupled to a nozzle 14 to allow a volume of fluid to flow through the sprinkler 10 during ordinary irrigation, but to automatically reduce the flow to a predetermined amount if the nozzle 14 is removed from the sprinkler 10, such as to replace the nozzle or by a vandal. This reduced flow is preferably discharged from the sprinkler 10 in a high stream of fluid to alert the user to the missing or damaged nozzle. The flow control device 12 is further configured for operation with a flush cap 16 to allow initial flushing of debris from the sprinkler 10 during installation.

The pop-up sprinkler 10 described and shown herein is one exemplary type of sprinkler that may be used with the flow control device 12. The sprinkler 10 and many of its components are similar to that shown and described in U.S. Pat. No. 6,997,393, which has been assigned to the assignee of the present application and which is incorporated by reference herein in its entirety. Other similar types of pop-up sprinklers and components are shown and described in U.S. Pat. Nos. 4,479,611 and 4,913,352, which also have been assigned to the assignee of the present application and which are also incorporated by reference herein in their entirety. As should be evident, various other types of sprinklers also may incorporate flow control device 12. Operation of the flow control device 12 generally involves interaction with certain internal structure and components of the sprinkler and is therefore suitable for many different types of sprinklers, including, for example, a fixed stem sprinkler.

Figure 1:
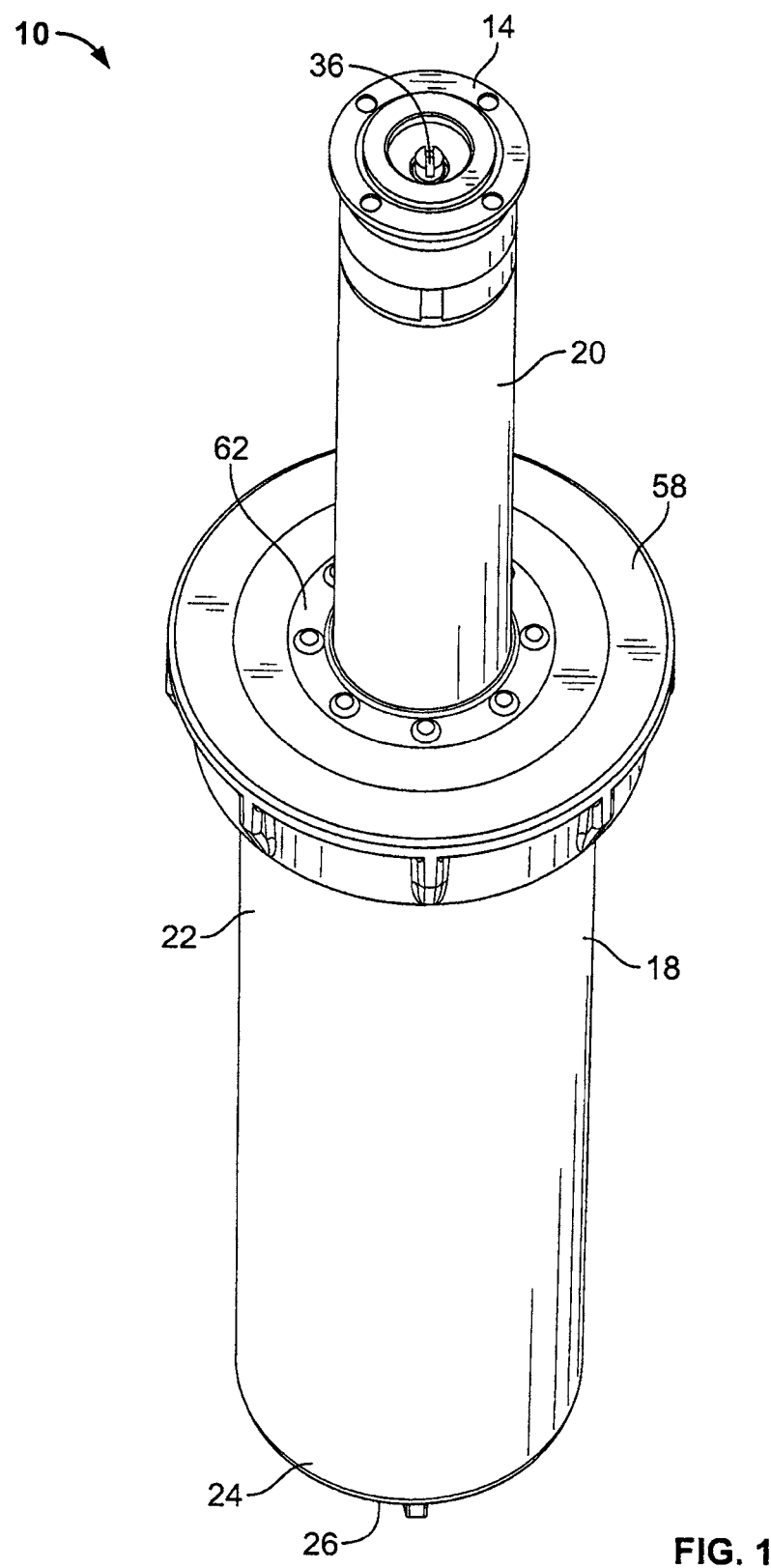
FIG. 1 is a perspective view of an irrigation sprinkler embodying features of the present invention with a riser in an elevated position for distributing water.
Figure 2:
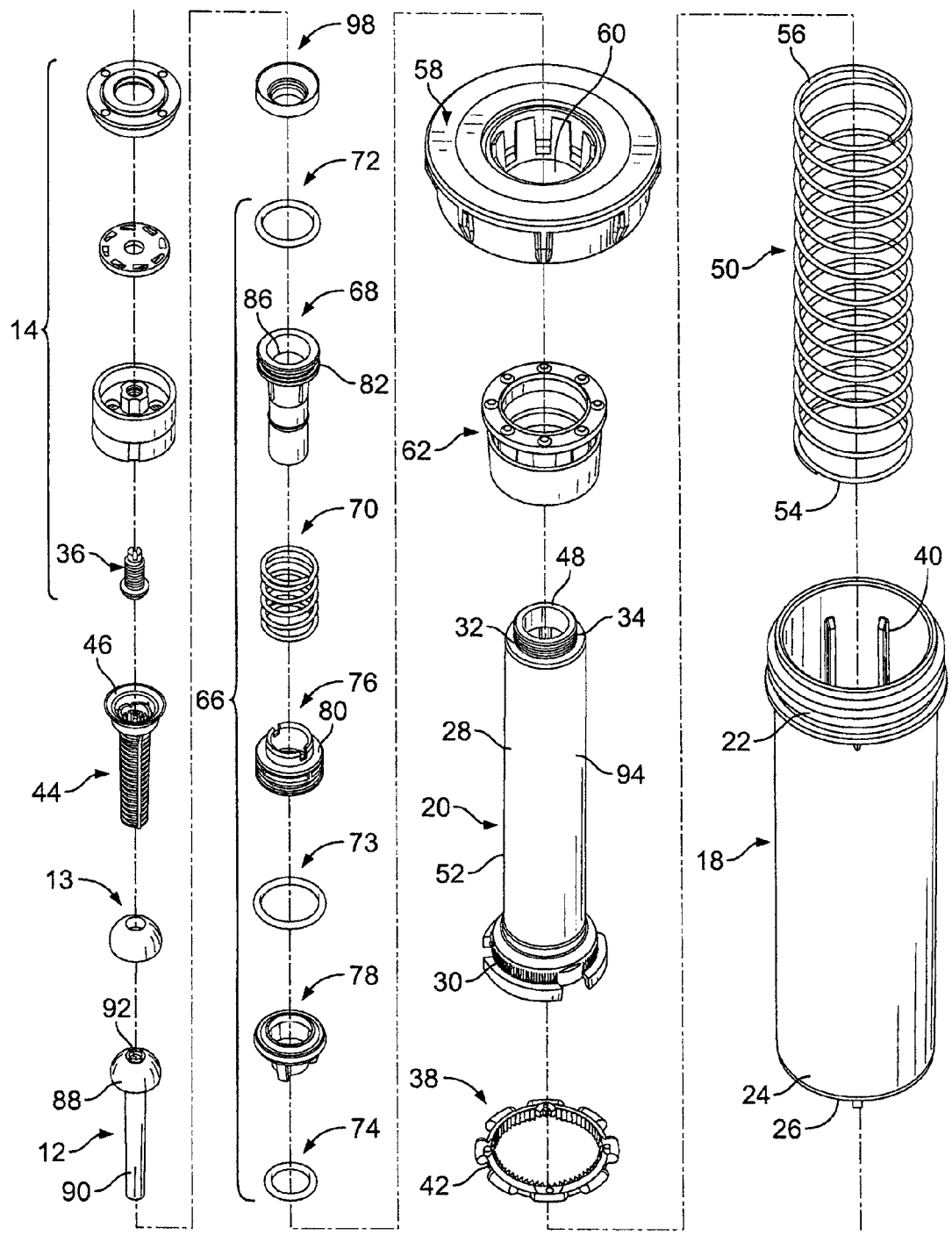
FIG. 2 is an exploded perspective view of the irrigation sprinkler of FIG. 1.
Figure 3:
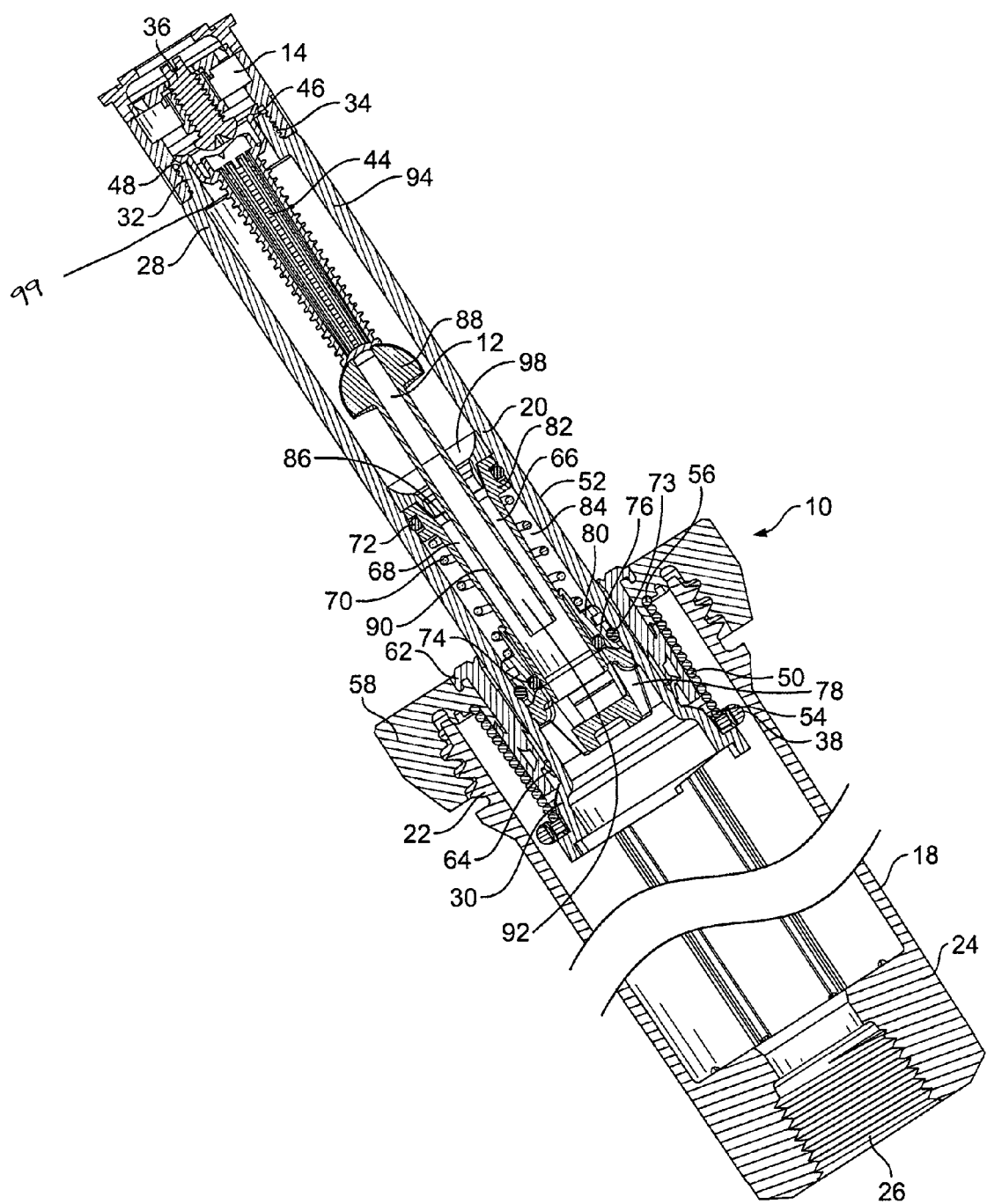
FIG. 3 is a cross-sectional view of the irrigation sprinkler of FIG. 1.
Figure 6:
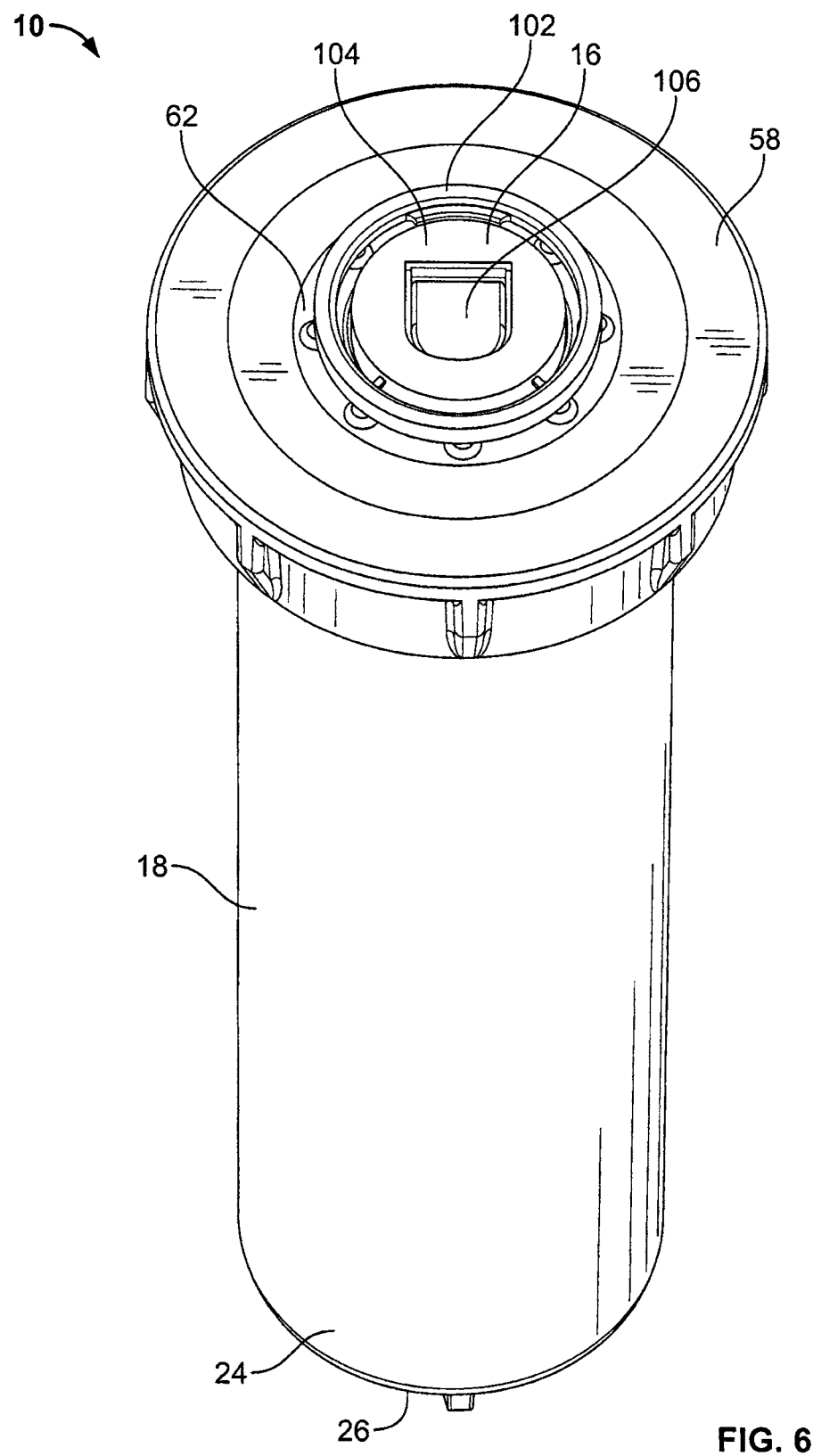
FIG. 6 is a perspective view of the irrigation sprinkler of FIG. 1 with the riser in a retracted position and the nozzle and filter replaced by a flush cap.
Figure 7:
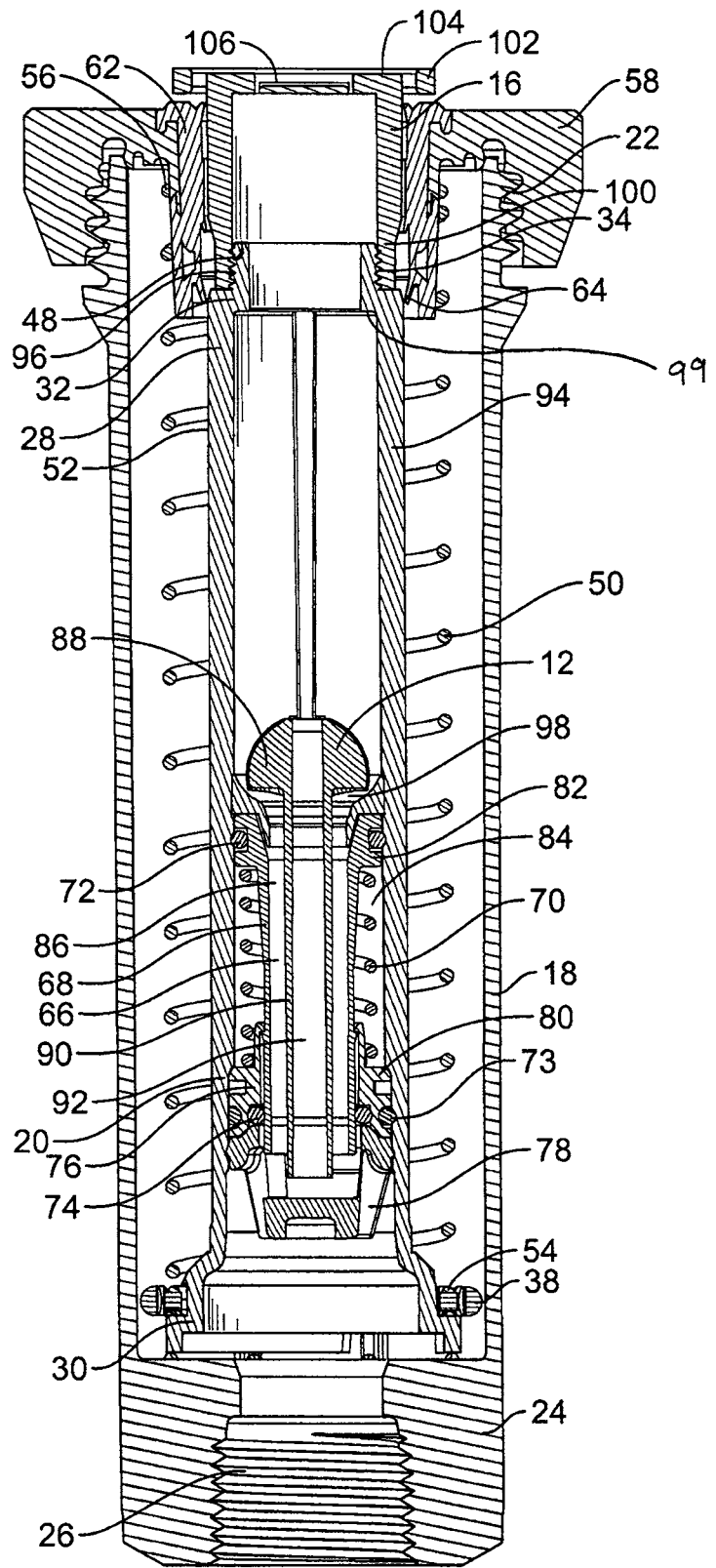
FIG. 7 is a cross-sectional view of the irrigation sprinkler of FIG. 6.
Figure 8:
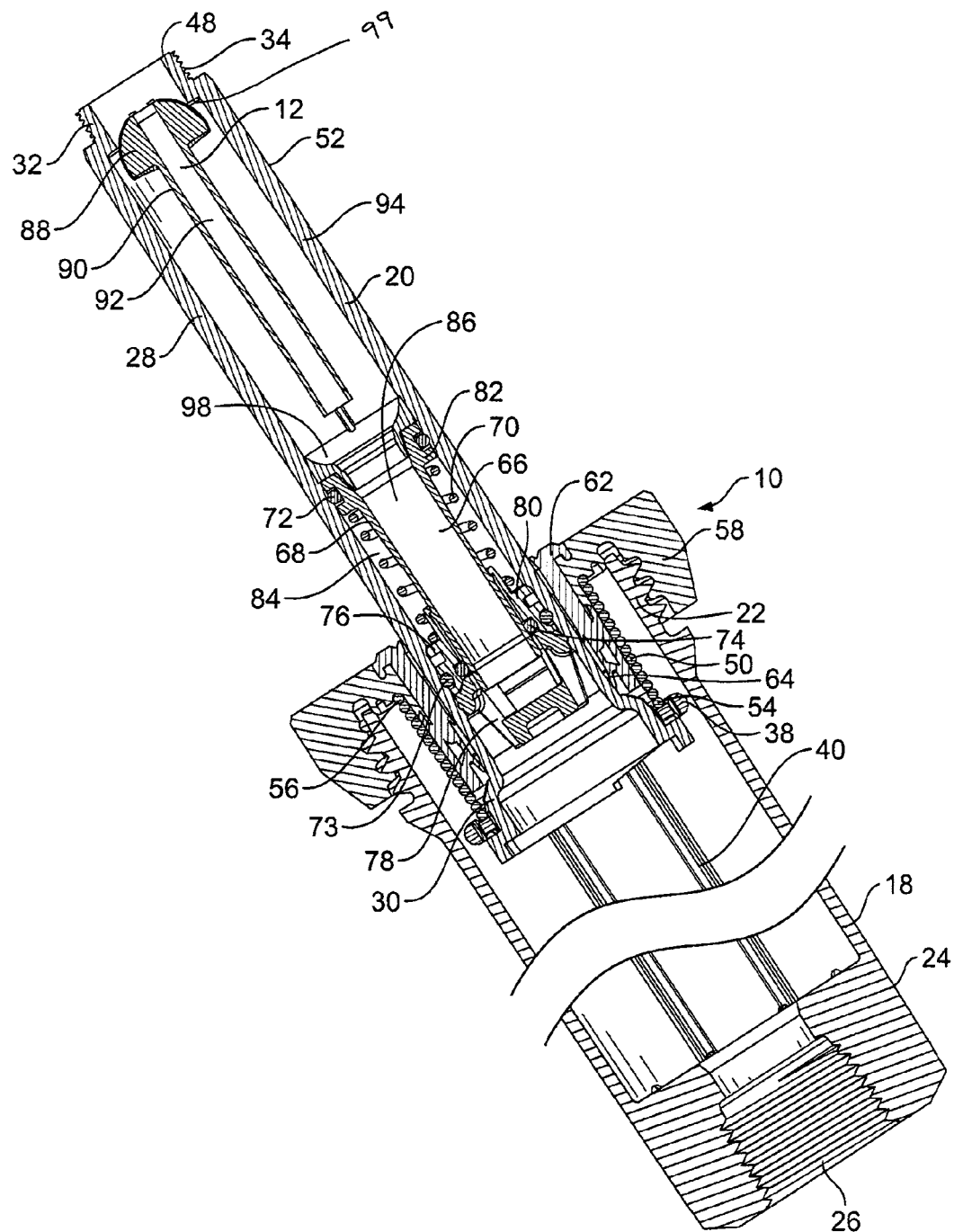
FIG. 8 is a cross-sectional view of the irrigation sprinkler of FIG. 1 with the riser in the elevated position, with the nozzle and filter missing, and with the flow control device engaging the top of the riser.

As shown in FIGS. 1-3, the sprinkler 10 generally includes a housing 18 and a riser assembly 20. The riser assembly 20 travels cyclically between a spring-retracted position, as shown in FIGS. 6-7, and an elevated spraying position, as shown in FIGS. 1, 3, and 8, in response to water pressure. More specifically, when the supply water is on, i.e., pressurized for a watering cycle, the riser assembly 20 extends ("pops up") above ground level so that water can be distributed to the terrain for irrigation. When the water is shut off at the end of a watering cycle, the riser assembly 20 retracts into the housing 18 where it is protected from damage.

The housing 18 provides a protective covering for the riser assembly 20 and, together with the riser assembly 20, serves as a conduit for incoming water under pressure. The housing 18 preferably has a generally cylindrical shape and is preferably made of a sturdy lightweight injection molded plastic or similar material, suitable for underground installation with the upper end 22 disposed substantially flush with the surface of the soil. The housing 18 preferably has a lower end 24 with an inlet 26 that is threaded to connect to a correspondingly threaded outlet of a water supply pipe (not shown). The sprinkler 10 may be one of a plurality of coordinated sprinklers in an irrigation network.

In one preferred form shown in FIGS. 2 and 3, the riser assembly 20 includes a non-rotatable stem 28 with a lower end 30 and an upper end, or nozzle mounting portion, 32. The stem 28 is preferably cylindrical in shape and is preferably made of a lightweight molded plastic or similar material. The riser assembly 20 has a threaded upper end 34 for attaching to the spray nozzle 14. The spray nozzle 14 ejects water outwardly from the sprinkler 10 when the riser assembly 20 is in the elevated spray position. Any of various interchangeable nozzles may be used having a desired arc of coverage or throw radius. A throttling screw 36 is preferably included in the spray nozzle 14 to allow adjustment of fluid flow through the spray nozzle 14. The terminal end of the throttling screw is moved toward and away from a seat formed in the top end of a filter 44.

The lower end 30 of the stem 28 preferably includes an adjusting guide 38. During movement of the riser assembly 20 between the retracted and elevated positions, the riser assembly 20 is restrained against rotation and guided by ribs 40 extending longitudinally along the inside of housing 18. The ribs 40 are slideably received within corresponding notches 42 formed in the adjusting guide 38.

The sprinkler 10 also preferably includes the filter 44 in the riser assembly 20 for filtering particulate material in the supply water prior to passing through spray nozzle 14. In one preferred form, the filter 44 has a lip 46 that engages a top rim 48 of the stem 28. The lip 46 is held against the top rim 48 when the nozzle 14 is threadedly mounted to the riser assembly 20. An example of a filter 44 is shown and described in U.S. Pat. No. 4,913,352.

A spring 50 for retracting the riser assembly 20 is preferably disposed in the housing 18 about the outside surface 52 of the stem 28. The spring 50 has a bottom coil 54 that engages the guide 38 and an upper coil 56 seated against the inside of a housing cover 58. The spring 50 biases the riser assembly 20 toward the retracted position until the water pressure reaches a predetermined threshold pressure. Typically, the threshold pressure is about 5 psi, at which time the water supply pressure acting on riser assembly 20 will be sufficient to overcome the force of the spring 50 and cause movement of the riser assembly 20 to the elevated spraying position.

The housing cover 58 serves to minimize the introduction of dirt and other debris into the housing 18. The housing cover 58 preferably has internal threads and is mounted to the upper end 22 of the housing 18 which has corresponding threads. The cover 58 has a central opening 60 through which the elongated riser assembly 20 is movable between the retracted position and the elevated spraying position. The housing cover 58 is also preferably fitted with a seal 62, preferably a wiper seal, mounted on the inside of the cover 58.

The wiper seal 62 is preferably formed of flexible material, such as rubber or soft plastic, and is disposed in opening 60. The wiper seal 62 preferably has one or more fingers 64 that slideably engage the outside of the riser assembly 20, as it reciprocates in and out of the housing 18 to wipe the outside of the riser assembly 20. This wiping action minimizes the amount of debris entering the housing 18 through the space between the housing 18 and the riser assembly 20 and on the surface of the riser assembly 20.

As can be seen in FIGS. 2, 3, 7, and 8, the sprinkler 10 also preferably includes a pressure regulating stem (PRS) module 66, or pressure regulator, for maintaining a relatively constant pressure at which water from spray nozzle 14 is ejected into the atmosphere. The PRS module 66 preferably has a flow tube 68 mounted for limited longitudinal movement within the riser assembly 20. The PRS module 66 also preferably includes a control spring 70, o-rings 72, 73, and 74, a retainer 76, and a flow seat 78. The control spring 70 is preferably engaged between an upper surface 80 of retainer 76 and a lower shoulder 82 of flow tube 68 in chamber 84, and it controls water pressure at the upper port 86 of the flow tube 68. The PRS module 66 operates to control the pressure of water, typically 30 pounds per square inch (psi), supplied to nozzle 14 by controlling movement of the flow tube 68 against the bias of the control spring 70 in response to the backpressure of water acting at upper port 86 on the downstream side of the PRS module 66. The PRS module, or pressure regulator 66, is similar to that shown and described in U.S. Pat. Nos. 6,997,393 and 4,913,352.

In the elevated spraying position, water flowing through riser assembly 20 to nozzle 14 passes through the PRS module 66, which functions to regulate the pressure supplied to nozzle 14 so that a substantially constant pressure of inlet water enters nozzle 14. By controlling the pressure at nozzle 14, any given nozzle will operate to provide the same water distribution pattern regardless of the inlet water pressure, and also will permit a wide range of nozzle sizes to be operated at the same selected pressure level. Other types of pressure regulators also may be used. Alternatively, the flow control device 12 may be used in a sprinkler without a pressure regulator.

Figures 4, 5:
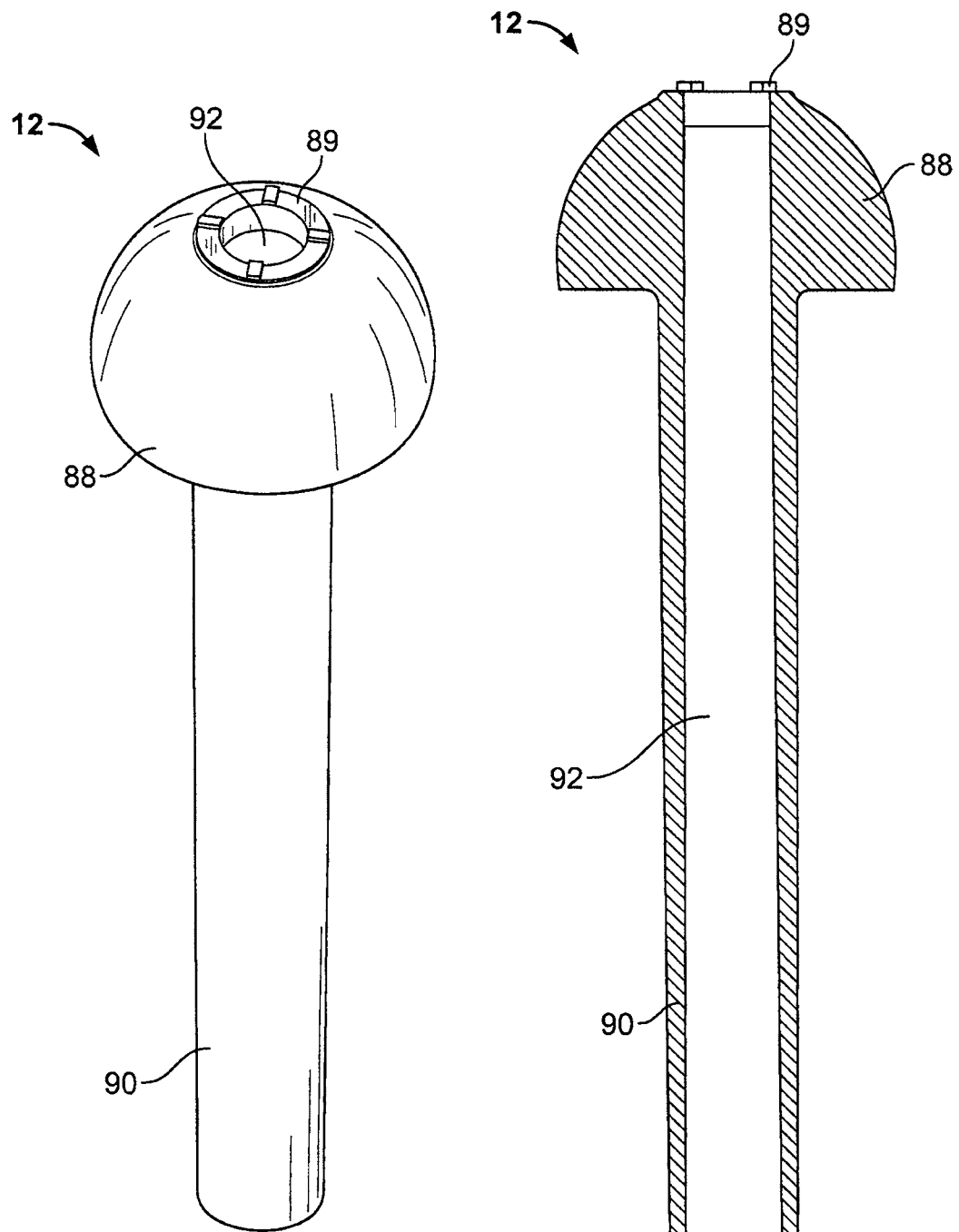
FIG. 4 is a perspective view of the flow control device of the irrigation sprinkler of FIG. 1.
FIG. 5 is a cross-sectional view of the flow control device of FIG. 4.

FIGS. 4 and 5 illustrate one form of a flow control device 12 used with sprinkler 10. As addressed below, and as shown in FIGS. 6 and 7, the flow control device 12 is preferably used with a flush cap 16 when flushing out debris during initial installation of the sprinkler 10. It is then preferably used when the flush cap 16 is removed and replaced with a nozzle 14 and filter 44 following flushing when the sprinkler is used for irrigation (FIGS. 1-3). During irrigation, the flow control device 12 functions as both a water saving measure and an alert mechanism when the nozzle 14 and filter 44 are separated from the riser assembly 20 (FIG. 8), as described further below.

FIG. 4 shows a perspective view of the flow control device 12. The shape of the flow control device 12 is preferably a hemispherical head 88 mounted on a hollow shaft 90 having a circular cross-section. The head 88 and shaft 90 have a through-hole, or flow passage 92, that extends longitudinally through the entire length of the flow control device 12. The head 88 also may include a ribbed annular lip 89 for engagement with the bottom of the filter 44. As shown in FIGS. 3 and 7, the shaft 90 is preferably sized for loose-fit reception within the flow tube 68 of the PRS module 66. Also, the maximum outer diameter of head 88 is preferably smaller than the inner diameter of the intermediate portion 94 of the riser assembly 20 to allow fluid to flow about the outside of the flow control device 12, as well as through the flow passage 92, during irrigation.

The flow control device 12 is preferably formed by any of various injection molding processes and may optionally include an overmolded cap 13 (FIG. 2). The flow control device 12 can be one integral component or multiple components combined together. For example, the head 88 and shaft 90 could be two separate components joined together with the overmolded cap 13 added later. The overmolded cap 13, preferably formed of an elastic material, may be used to provide a good seal when engaging the upper end 32 of the stem 28.

FIGS. 6 and 7 show the pop-up sprinkler 10 in a retracted position with the flush cap 16 attached to the stem 28. The flush cap 16 has internal threads 96 for threaded engagement with the threaded upper end 32 of the stem 28. In this retracted position, prior to water pressurization, the flow control device 12 is disposed at a lowermost position within the riser assembly 20 with a portion of the flow control device 12 within the flow tube 68. In this lowermost position, the underside of head 88 preferably engages a protective shroud 98.

The shroud 98 is preferably fixedly mounted within the riser assembly 20 and projects downwardly into the upper port 86 of the flow tube 68 for deflecting and directing grit and other particulate material downwardly into flow tube 68 when the riser assembly 20 is in its retracted position. An example of the shroud 98 is shown and described in U.S. Pat. No. 4,913,352. The shape of the shroud 98 used herein is preferably more cup-shaped than such previous designs in order to better guide the shaft 90 of the flow control device 12 into the flow tube 68. This cup shape avoids having the flow control device 12 become stuck when it is moving downwardly within the riser assembly 20, such as after flushing or after replacement of the nozzle 14 and the filter 44. That is, the shroud 98 has a steeper profile than previous shallower designs to prevent the lower end of the shaft 90 from becoming stuck on the shroud 98. Experience shows that this cup shape may be desirable for spray heads that have relatively short pop-up riser assemblies.

During flushing, water flows through the riser assembly 20 causing it to rise to an elevated spraying position. Water enters the inlet 26 and flows through the housing 18. Water then enters the riser assembly 20 and flows through the flow tube 68.

Further, water flowing through the riser assembly 20 causes the flow control device 12 to move longitudinally upwardly to an uppermost position within the riser assembly 20. In this uppermost position, the top of flow control device 12 engages and seals against the stem 28. More specifically, the threaded upper end 32 of the stem 28 has a smaller cross-sectional area than the intermediate portion 94 of the riser assembly 20, forming an inner shoulder 99, and it has a smaller cross-sectional area than the maximum cross-sectional area of the hemispherical head 88. Thus, the top portion of the flow control device 12 engages the nozzle mounting portion 32 in this uppermost position and obstructs fluid flow about the outside of the flow control device 12. Water, however, flows through the flow passage 92 of the flow control device 12 and enters and discharges from the flush cap 16.

Various types of flush caps may be used. The flush cap 16 shown herein is also shown in U.S. Pat. No. D319,489, which is incorporated herein by reference. Flush cap 16 is preferably cylindrical in shape and has internal threading on its lower portion 100 for mounting onto the top of the stem 28 of the riser assembly 20 for shipping. The flush cap 16 preferably has an outer ring 102 along its top surface 104 to facilitate removal and replacement of the flush cap 16 with the nozzle 14 and the filter 44 after the pop-up sprinkler 10 is installed and flushed. The top 104 of the flush cap 16 also preferably includes a flap 106 that hinges upwardly in response to water pressure to allow flushing during the initial pressurization of the sprinkler 10. Otherwise, the flap 106 prevents debris from entering the sprinkler 10. Thus, during flushing, water flowing through the flow passage 92 of the flow control device 12 flows through the flush cap 16 and exits the sprinkler 10 through the opening provided by the movement of the flap 106.

After flushing, as shown in FIGS. 1-3, the flush cap 16 may be replaced with the nozzle 14 and the filter 44. In the retracted, non-irrigating position, no water flows through the sprinkler 10. The flow control device 12 experiences no upwardly-directed water pressure and rests near the bottom of the riser assembly 20 in the lowermost position (as during flushing—see FIG. 6), as a result of gravity. Again, in this resting position, the underside of the hemispherical head 88 engages the cup-shaped shroud 98.

Following pressurization, the riser assembly 20 moves upwardly to the elevated spraying position, as shown in FIGS. 1 and 3. With the nozzle 14 and the filter 44 installed, the filter 44 extends downwardly into the riser assembly 20. Water pressurization exerts a force urging the flow control device 12 upwardly until the head 88 engages the bottom of the filter 44. The filter 44 stops further upward movement of the flow control device 12 in response to water pressure. The flow control device 12 remains in this intermediate position during irrigation. The ribbed annular lip, or spacer, 89 of the head 88 preferably engages the filter 44 to space the rest of the head 88 away from the filter 44 and form flow channels therebetween. Experience has found that this lip 89 helps reduce "bouncing" of the head 88 against the filter 44 in response to fluctuations in water pressure.

During irrigation, water enters the inlet 26, flows through the housing 18, enters the riser assembly 20, and flows through flow tube 68. Water then preferably flows along two flow paths: (1) through the flow passage 92 and along the flow channels formed by the lip 89; and (2) outside of the hemispherical head 88 in the region between the head 88 and the inside wall of the stem 28. Water from these two flow paths continues through the filter 44 to the spray nozzle 14, and then discharges from the sprinkler 10. Alternatively, the head 88 need not include a ribbed annular lip 89 at all, and, in that event, the filter 44 may block upward flow of water through the flow passage 92 when the head 88 engages the filter 44.

FIG. 8 shows operation of the pop-up sprinkler 10 with the nozzle 14 and the filter 44 removed, such as might occur due to vandalism or when changing a nozzle. When the nozzle 14 and the filter 44 are absent, the filter 44 no longer provides a stop to engage the hemispherical head 88 and prevent further upward travel of the flow control device 12. Hence, the fluid exerts an unopposed upward force against the flow control device 12 causing the hemispherical head 88 to move upwardly to the uppermost position, or signaling position, in the riser assembly 20. In this uppermost position, the head 88 engages the reduced cross-section transition at the upper end 34. The head 88 then blocks flow around it but allows a smaller volume of water to flow through the flow passage 92 and out of the pop-up sprinkler 10. This stream of water exiting from the sprinkler 10 acts as a "flag" to alert individuals that the nozzle 14 and the filter 44 are detached from the pop-up sprinkler 10.

Thus, the flow control device 12 decreases the amount of water that would otherwise be wasted prior to re-installation of the nozzle 14 and the filter 44. It does so in two ways. First, it decreases the quantity of water that is exiting the sprinkler 10. Second, it provides a signal to individuals that the nozzle 14 and the filter 44 need to be replaced. This signal allows individuals to re-install the nozzle 14 and the filter 44 sooner than they otherwise might have.

As should be evident, the flow control device 12 may be designed to have different desired dimensions. The diameter of the flow passage 92 is preferably selected to balance design considerations, including reducing water loss for water exiting the sprinkler 10, providing a volume sufficient to ensure a tall noticeable stream of signaling water, and providing a volume sufficient to flush debris out of the sprinkler 10 during flushing. For the form of the sprinkler 10 and the flow control device 12 described herein, experience has shown that a through-hole diameter of about 0.125 inch or 0.188 inch, which reduces the volume of discharged water on the order of about 50-70%, is preferable to balance these design considerations. In this form, the sprinkler 10 may produce a 10-15 foot tall stream of water during signaling. Of course, the through-hole diameter and other dimensions of the flow control device 12 may be designed to reduce the amount of discharged water a different desired percentage.

Also, as should be evident, other shapes of the flow control device 12 are possible that cooperate with the internal structure of the sprinkler 10. The flow control device 12 is not limited to the form shown herein. The shape should preferably be sufficient to engage the filter 44 in the intermediate, or irrigating, position during irrigation and to engage the threaded upper end 34 in the uppermost, or signaling, position during signaling and flushing. For example, the flow control device 12 may have a head 88 that is spherical or rectangular, may have a shaft 90 of different cross-section, or may include various numbers, shapes, and dimensions of component portions.

Further, as should be evident, various types of filters may be used with the flow control device 12. The filter should preferably be sized to hold the flow control device 12 in an intermediate position during irrigation and to limit further upward movement of the flow control device 12 during irrigation. The filter may therefore have different shapes and dimensions. Indeed, other types of filters or components may be sized to accomplish the same function with respect to movement of the flow control device 12 in the riser assembly 20.

Moreover, although the flow control device 12 has been described relative to one form of sprinkler 10, it should be apparent that the flow control device may be used with various other types. For example, although shown with a spray head type sprinkler, the flow control device 12 may be used with fixed stem sprinklers or rotor type sprinklers having a mechanism for effecting rotation of a turret in a riser assembly.

Another aspect involves a method of irrigation using an irrigation sprinkler having a flow control device. The sprinkler generally includes a stem having an inlet for receiving pressurized fluid for irrigation and an outlet and further includes a flow control device disposed in the stem and moveable longitudinally in response to fluid flow between a first position and a second position. In one form, the method comprises: releasably mounting a nozzle and a filter to the stem; transmitting pressurized fluid flow through the stem; causing the flow control to move to the first position for irrigation; and causing the flow control to move to the second position and a stream of fluid to exit the sprinkler for signaling removal of the nozzle. The method may further include: releasably mounting a flush cap to the stem; transmitting pressurized fluid through the stem; and causing the flow control to move to the second position for flushing debris out of the sprinkler.

It will be understood that various changes in the details, materials, and arrangements of parts and components which have been herein described and illustrated in order to explain the nature of the sprinkler and the flow control device may be made by those skilled in the art within the principle and scope of the sprinkler and the flow control device as expressed in the appended claims. Furthermore, while various features have been described with regard to a particular embodiment or a particular approach, it will be appreciated that features described for one embodiment also may be incorporated with the other described embodiments.

What is claimed is:

1. A sprinkler comprising:
a stem having an inlet for receiving pressurized fluid for irrigation and an outlet;
a nozzle releasably mounted to the outlet of the stem for discharging pressurized fluid from the sprinkler for irrigation; and
a flow control having a seat and a valve component moveable relative to the seat and disposed in the stem, the valve component moveable longitudinally between a first irrigating position in which a first amount of fluid exits the stem through the outlet and a second signaling position in which a second, reduced amount of fluid exits the stem through the outlet;
wherein the flow control is operatively coupled to the nozzle such that the valve component is in the first position in response to fluid flow when the nozzle is mounted to the stem and moves longitudinally to the second position in response to fluid flow when the nozzle is removed from the stem; and
wherein the valve component defines a flow passage therethrough.

2. The sprinkler of claim 1 further comprising a filter disposed in the stem between the nozzle and the flow control.

3. The sprinkler of claim 2 wherein the filter provides a stop for the valve component when in the first position.

4. The sprinkler of claim 2 wherein the flow control further comprises a spacer for engagement with the filter and defining flow channels when engaging the filter.

5. The sprinkler of claim 1 wherein two flow paths exist when the valve component is in the second position, one flow path around the valve component in the stem and a second flow path through the flow passage of the stem.

6. The sprinkler of claim 1 wherein the flow passage has a predetermined cross-sectional area selected to reduce fluid loss for fluid exiting the sprinkler when the nozzle is removed but to provide sufficient flow for a stream of fluid exiting the sprinkler to signal removal of the nozzle.

7. The sprinkler of claim 1 wherein the valve component is in the shape of a hollow cylindrical shaft terminating in a hemispherical head, the flow passage extending through the shaft and the head.

8. The sprinkler of claim 7 wherein the hemispherical head includes an overmolded layer.

9. The sprinkler of claim 1 wherein the valve component engages the stem in the second position in response to fluid flow.

10. The sprinkler of claim 1 further comprising a flush cap that is releasably mounted on the stem in place of the nozzle, the flush cap allowing fluid to exit therefrom during initial pressurization to flush debris from the stem.

11. The sprinkler of claim 1 further comprising a pressure regulator in the stem for maintaining a relatively constant fluid pressure at the nozzle, the pressure regulator sized for reception of at least a portion of the flow control.

12. The sprinkler of claim 1 further comprising a housing and wherein the stem forms part of a riser assembly, the riser assembly having an extended position when pressurized for irrigation and a retracted position in the housing when not pressurized for irrigation.

13. The sprinkler of claim 1 further comprising a guide configured for reception of at least a portion of the valve component in at least the first position.

14. A sprinkler comprising:
a stem having an inlet for receiving pressurized fluid for irrigation and an outlet;
a nozzle releasably mounted to the outlet of the stem for discharging pressurized fluid from the sprinkler for irrigation; and
a flow control disposed in the stem and moveable longitudinally between a first irrigating position in which a first amount of fluid exits the stem through the outlet and a second signaling position in which a second, reduced amount of fluid exits the stem through the outlet;
wherein the flow control is operatively coupled to the nozzle such that the flow control is in the first position in response to fluid flow when the nozzle is mounted to the stem and moves longitudinally to the second position in response to fluid flow when the nozzle is removed from the stem;
wherein the flow control engages the stem in the second position in response to fluid flow;
wherein the flow control comprises a top portion for engagement with a nozzle mounting portion of the stem in the second position.

15. The sprinkler of claim 14 wherein the top portion is, at least in part, spherical or cylindrical in shape.

16. The sprinkler of claim 14 further comprising:
a flush cap that is releasably mounted to the stem in place of the nozzle, the flush cap allowing fluid to exit therefrom during initial pressurization to flush debris from the stem.

17. The sprinkler of claim 16 wherein the flow control is moveable longitudinally in the stem in response to fluid flow between the first position in which a first amount of fluid exits the stem through the outlet and the second position in which a second, reduced amount of fluid exits the stem through the outlet.

18. The sprinkler of claim 17 wherein the flow control is operatively coupled to the nozzle such that the flow control is in the first position in response to fluid flow when the nozzle is mounted to the stem and moves longitudinally to the second position in response to fluid flow when the nozzle is removed from the stem.

19. The sprinkler of claim 18 further comprising a filter that provides a stop for the flow control when in the first position.

20. The sprinkler of claim 16 wherein the flow passage has a predetermined cross-sectional area selected to reduce fluid loss for fluid exiting the sprinkler when the nozzle is removed, to provide sufficient flow for a stream of fluid to signal removal of the nozzle, and to provide sufficient flow for flushing when the flush cap is mounted.

21. The sprinkler of claim 16 wherein the flush cap includes a flap that is responsive to fluid pressure to define an opening for flushing debris out of the stem during an initial pressurization.

22. A method of irrigation using an irrigation sprinkler, the sprinkler including a stem having an inlet for receiving pressurized fluid for irrigation and an outlet, and including a flow control having a seat and a valve component moveable relative to the seat and disposed in the stem, the valve component moveable longitudinally in response to fluid flow between a first position and a second position, the valve component defining a flow passage extending therethrough, the method comprising:
releasably mounting a nozzle and a filter to the stem;
transmitting pressurized fluid flow through the stem;
causing the valve component to move to the first position for irrigation; and
causing the valve component to move to the second position and a stream of fluid to flow through the flow passage and exit the sprinkler for signaling removal of the nozzle.

23. The method of claim 22 further comprising:
releasably mounting a flush cap to the stem;
transmitting pressurized fluid through the stem; and
causing the valve component to move to the second position for flushing debris out of the sprinkler.

* * * * *